United States Patent [19]

Isamu

[11] Patent Number: 4,895,554

[45] Date of Patent: Jan. 23, 1990

[54] MECHANISM FOR MOVING GRIPPER AND ADJUSTING LOCI OF ITS MOTIONS IN WORK TAKEOUT DEVICE

[75] Inventor: Tadokoro Isamu, Moriyama, Japan

[73] Assignee: Shinsei Kagaku Co., Ltd., Osaka, Japan

[21] Appl. No.: 339,196

[22] Filed: Apr. 14, 1989

[51] Int. Cl.$^4$ .............................................. F16H 55/36
[52] U.S. Cl. ..................................... 474/141; 474/166
[58] Field of Search ............... 474/101, 141, 148, 150, 474/166, 167, 198

[56] References Cited

U.S. PATENT DOCUMENTS 3,299,228 1/1967 Tormolen ..................... 474/141 X

*Primary Examiner*—Thuy M. Bui

[57] ABSTRACT

The present invention relates to a mechanism for moving and adjusting the loci of motions of a gripper adapted for seizing the work such as the product of a plastic molder or a sprue runner, etc. It is provided with an actuator, a turnover arm of which one end is connected to the rotary shaft of the actuator, while a gripper is linked to the other end, a noncircular pulley loosely fitted around the rotary shaft of the aforementioned actuator, a circular pulley mounted on the other end of the turnover arm through a shaft rod, a belt spanned between the noncircular pulley and the circular pulley, to be turned therearound, and a spring member which exhibits a maximum elastic rebounding force, when the turnover arm is brought to be realy horizontal.

2 Claims, 8 Drawing Sheets

MECHANISM FOR MOVING GRIPPER AND ADJUSTING LOCI OF ITS MOTIONS IN WORK TAKEOUT DEVICE

BACKGROUND OF THE INVENTION

1. Field of the invention

The present invention relates to a gripper carrying mechanism for repeating a series of operation steps of moving a gripper seizing a work in dies from between dies to our of the machine, releasing the work and, then returning the gripper again to between dies and another mechanism for configuring the gripper, for it to have the desired angles at every stop, while carrying a work such as a product of an injection molding machine or a sprue runner, etc., in a device for taking out the work.

2. Prior art

Heretofore, a gripper of work take-out devices of this type takes a work in dies out of the machine by moving said gripper in the up—down and right—left directions by way of combining several air cylinders including long ones which have long strokes in the vertical (up—down) direction and other ones which move fore—aft and right—left.

The prior art device requires a long air cylinder which has a long stroke in the vertical direction, as hereabove described; consequently, the total height of the work take-out device is so large that it can not be installed in a factory with a low ceiling.

This device, adopting a system of a gripper standing by above dies, sometimes has not been able to work with dies having air cylinders mounted on their tops for undercutting process, etc.

Furthermore, such a device, requiring at least an air cylinder for moving the gripper up—down and one for its right—left motion, has been disadvantageous in that not only its composition is complex, but large air consumption has resulted in high running cost.

SUMMARY OF THE INVENTION

A main object of this invention is to decrease the total height of the work takeout device by designing the gripper's motion so as to give a locus of rising in a straight line from its state of projecting from one end of a turnover arm, when it has come to seize a work, and then, form a locus of drawing a flat parabola, while the work bottom also forms lower loci in the similar manner, thus, the comparison being made with the prior art device's dimensions corresponding with the up-down and right-left movements along these loci.

In keeping with another object of this invention, the work may be taken out by means of a turnover arm from a position above dies and distanced therefrom, thus permitting the stand-by for opening - closing of the dies; therefore, this device is usable with dies carrying an air cylinder or a motor, etc., on the top thereof for undercutting process, etc., whereby its utilization range is expanded, and moreover, there is no need of moving the work takeout mechanism at the time of die replacing operation.

In keeping with still another object, the need of a cylinder for gripper's up—down motion and that for its right—left motion for moving the work out of the equipment are obviated, with the device so designed as to conduct such operations by a single small actuator for simplified mechanism; as a result, not only this mechanism may be offered at a low cost, but the energy for moving the air cylinders is saved, which is condusive to reduced running cost; thus, this invention is to provide a mechanism which is quite useful as that for gripper's transfer as well as its motion's lotus adjustment in a work takeout device.

Still other objects and particular features and benefits of this invention will become evident from the description taken hereunder:

In order to attain the above-described objectives, according to this invention, on the rotary shaft of an actuator right and left turnably mounted on the machine body, a noncircular pulley is loosely fitted, while a part near one end of the turnover arm is engaged thereon. The noncircular pulley is fixed on the machine body in such a way that it is held in a definite direction without being affected by the rotary shaft, while the turnover arm is loocked on the rotary shaft.

In the other end of the turnover arm, a shaft rod is rotatably inserted and on the shaft rod projecting from the turnover arm to both sides thereof, there are provided a circular pulley in line with or on the corresponding side to the noncircular pulley and a gripper having freely open—closable nails at its tip on the other side.

Further, to one end of the turnover arm, a spring member which exhibits a maximum elastic rebounding force, when the turnover arm is brought to be nearly horizontal, is hound while the other end of the spring member is fixed to the machine body. Thus the spring member is so fitted that when the gripper's nails are distanced from each other and the turnover arm is brought nearly horizontal on the dies or when the nails are approached to each other to grip the work, then, the gripper is moved forward by a hydraulic cylinder, thereby drawing the work off the dies and the turnover arm is brought to be nearly horizontal on the work delivering side, it will make a maximum elongation (deflection) and that this spring member will provide an auxiliary power, when the turnover arm starts its motion and a braking force at the termination of the turnover.

Since the aforementioned spring means is able to provide shutdown control and start air, relatively small capacity and low priced acturators will do, without requiring large capacity and high-priced ones, nor provision of any powerful binding mechanism for binding the rotary shaft and the turnover arm nor use of high priced bumpers, not only giving rise to cutback on the manufacturing unit price, but enabling miniaturization of the actuator, for the benefit of saving in the compressed air as a power meidum' such other benefits will be available.

DETAILED DESCRIPTION OF THE INVENTION

Figure 1:
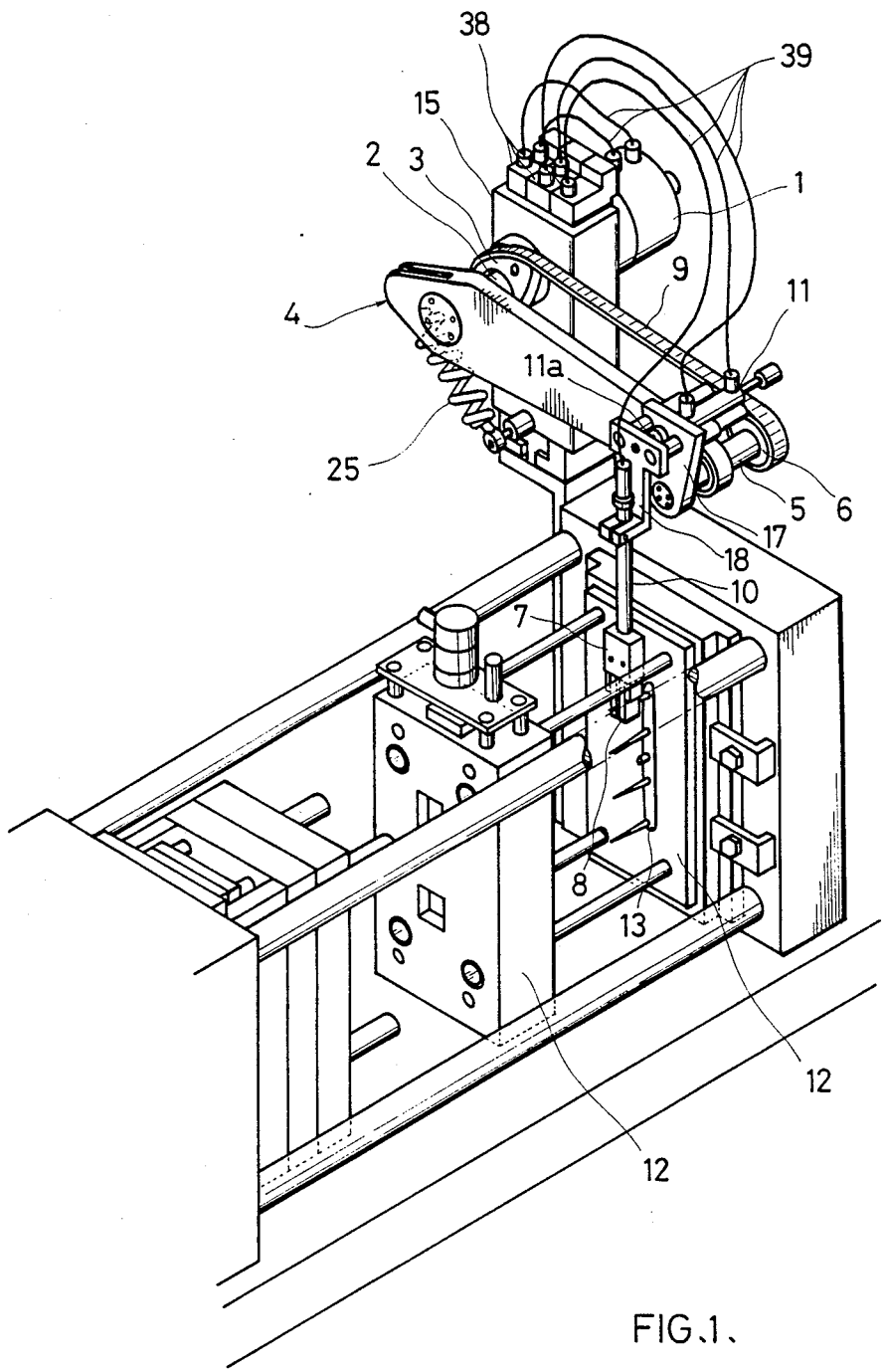
FIG. 1 is a perspective view of an embodiment of this invention, showing the state of the turnover arm turned over right-ward and gripping a work in the dies.
Figure 2:
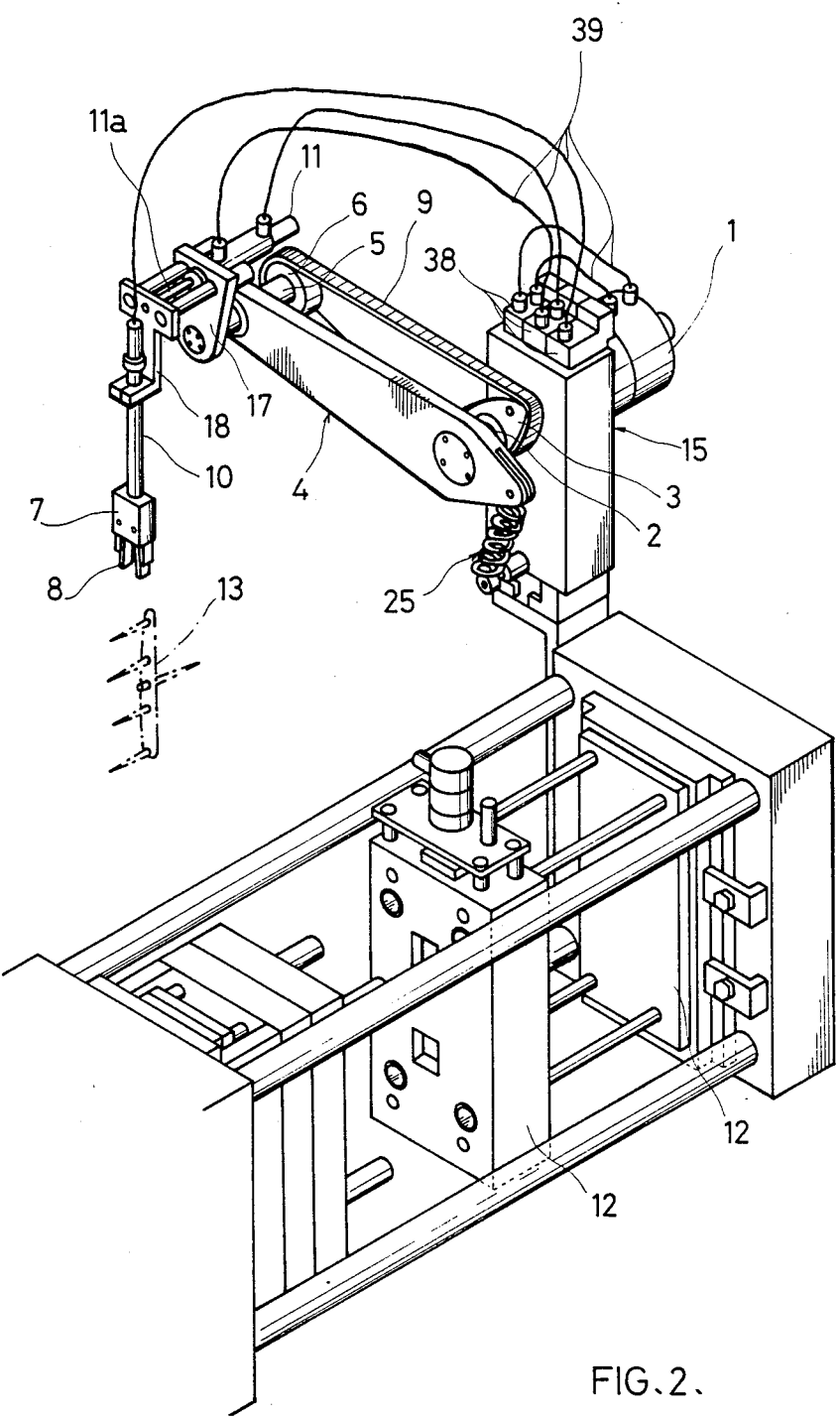
FIG. 2 is a perspective view of the same, showing the state of the turnover arm turned over left-ward from the state of FIG. 1, with the work taken out of the machine.
Figure 3:
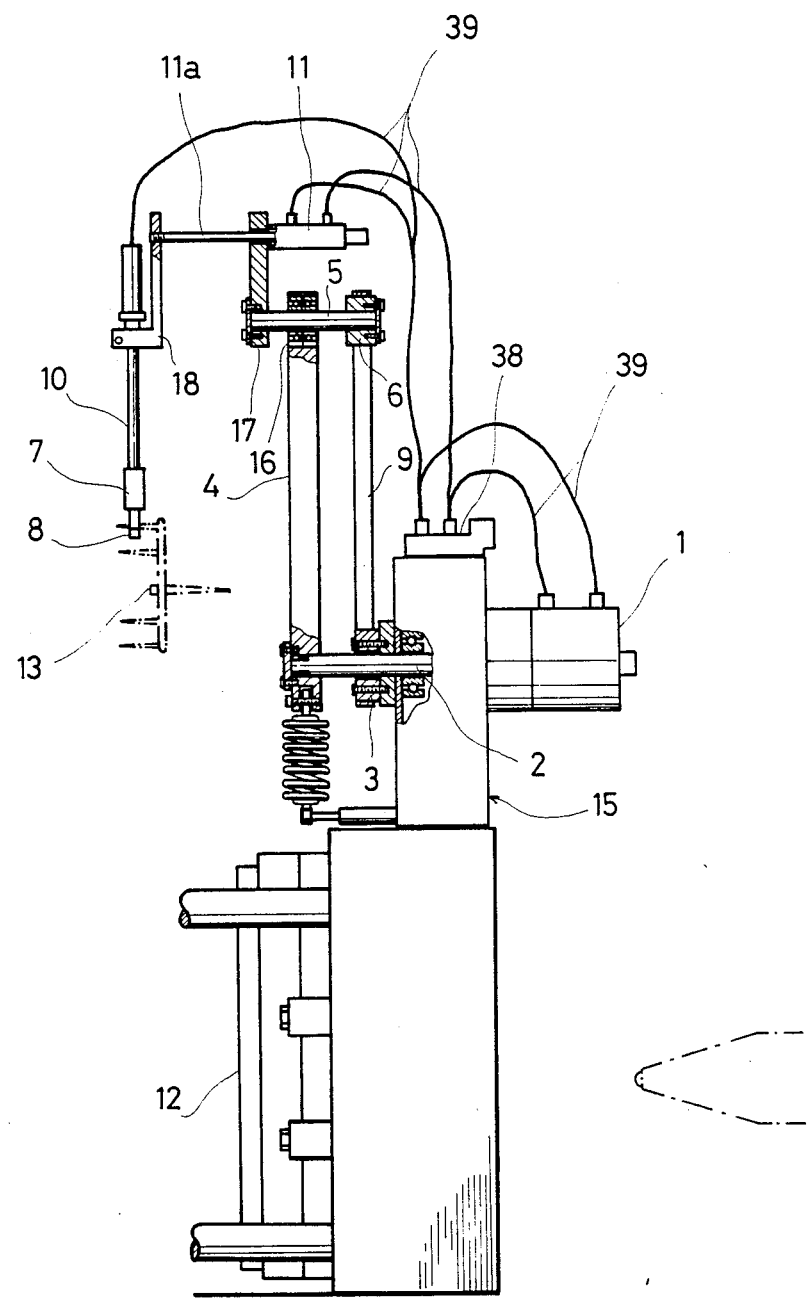
FIG. 3 is a side view, partly in seciton, of the same, showing it in the state of the turnover arm being turned leftward from the state of FIG. 1 and being held in its upright posture.

An embodiment of this invention represented by FIGS. 1 through 7 is described hereunder:

On a rotary shaft 2 of an actuator 1 like a vane shape rotary actuator, etc., which is mounted on the machine body 15 and which has a function of making right- and leftward turnover, the center of a pulley 3 in the shape of an ellipse or in any other appropriate noncircular shape is loosely fitted and a part near one end of the turnover arm 4 is fitted on the outside of the noncircular pulley 3. While the aforementioned noncircular pulley 3 is fixed on the machine body 15 (for example, housing, etc., of the actuator 1) such that its state of being in a definite direction is maintained without sustaining any rotaional effect of the rotary shaft 2, the turnover arm 4 has its part near one end thereof securely fitted on the rotary shaft 2, to be turned in concert therewith.

On the other end of this turnover arm 4, a shaft rod 5 is rotatably supported through a bearing 16 and a circular pulley 6 is securely fitted on said shaft rod 5 on the side corresponding to the noncircular pulley 3, as seen from the turnover arm 4, and a supporting plate 17 is locked on this shaft rod 5 on the apposite side to the circular pulley 6; a hydraulic cylinder 11 adapted for fore aft motion is mounted on the top of this supporting plate 17 and on the tip of a piston rod 11a of this hydraulic cylinder 11, another hydraulic cylinder 10 which effects opening-closing of gripper 7's nails 8 is held by means of a supporting frame 18.

Figure 6:
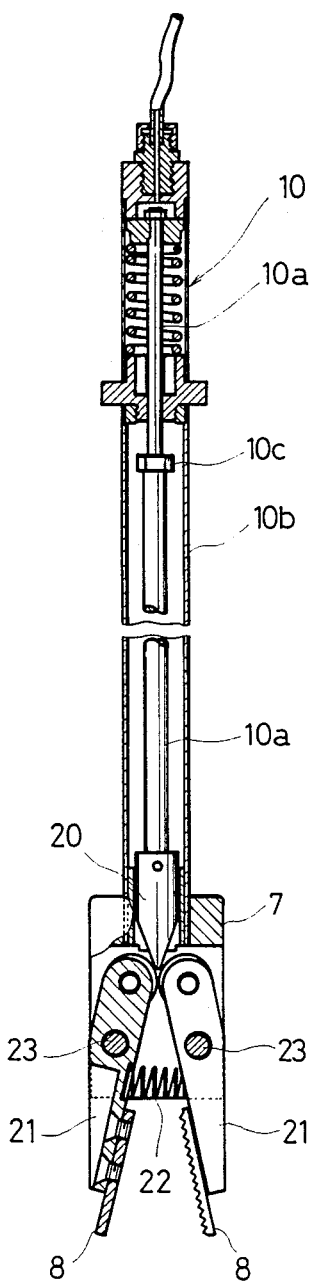
FIG. 6 is a longitudinal sectional view of a gripper and its cylindrical parts.

In the hydraulic cylinder 10, as shown in FIG. 6, two piston rods 10a, 10a are coupled with a nut 10c in an outer cylinder 10b and a wedge 20 is coupled to said piston rod 10a at its bottom. While to the bottom of the aforementioned outer cylinder, a gripper 7 is connected, to this gripper 7, fingers 21 having nails 8 fixed thereon are attached, with a bias provided by a spring 22 elastically inserted between pivotal shafts 23, 23; normally, the nails 8, 8 are opened apart by the elastic rebounding force of the spring 22, as shown in FIG. 6, but by pushing down the piston rod 10a, the wedge 20 is moved downward, thereby closing the nails 8, 8, to grip the work 13 in the dies 12, 12.

The mechanism is so set that after the nails 8, 8 have made the opening operation or after they have made the closing operation and the work 13 has been taken out of the dies 12 by means of the piston rod 11a of the hydraulic cylinder 11, the actuator 1 is to be turned over and a belt 9 is spanned between the noncircular pulley 3 and the circular pulley 6, to be turned therearound.

To one end of the turnover arm 4, one end of a spring member 25 which exhibits a maximum elastic rebounding force, when the turnover arm 4 is brought to be nearly horizontal, is securely coupled, while the other end of the spring member 25 is fixed to the machine body 15. Thus the spring member 25 is so provided that its maximum elongation (deflection) will occur, when the turnover arm 4 has been brought to be nearly horizontal above the dies 12, with the gripper 7's nails 8 opened apart, or when the turnover arm 4 has been brought to be nearly horizontal on the work delivering side, after the nails 8 were closed, to grip the work 13, then, the gripper 7 was brought forward by a hydraulic cylinder 11 and the work 13 was drawn off the dies 12.

Figure 4A:
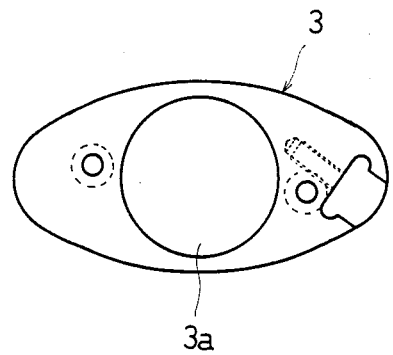
FIG. 4A–4C shows a noncircular pulley, FIG. 4A being its back view, FIG. 4B its sectional view, and FIG. 4C a perspective view with a guide frame for a belt fitted.
Figure 4B:
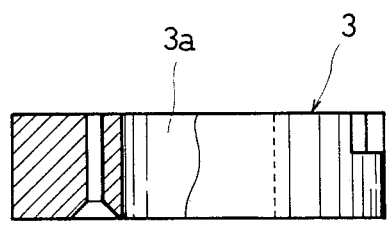
Figure 4C:
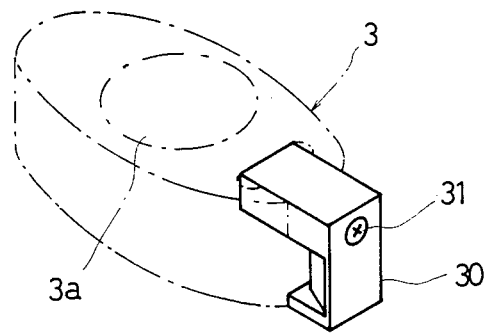

The noncircular pulley 3 is elliptical, as shown in FIGS. 4A–C; at the center thereof, a hole 3a for inserting the rotary shaft 2 is formed, with a guide frame 30 for guiding the belt 9 fixed on its outer periphery with a screw 31, etc. This noncircular pulley 3 may be substituted by an arrangement of a plurality of small pulleys or pins, etc., nearly internally along the profile of the pulley.

Figure 5A:
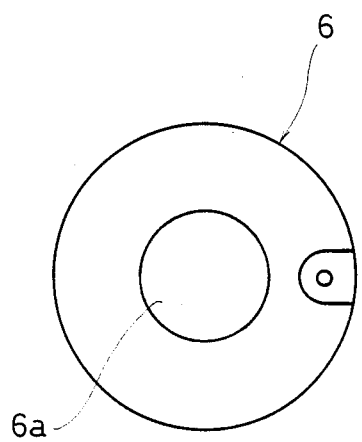
FIG 5A–5C shows a circular pulley, FIG. 5A being its back view, FIG. 5B its sectional view, and FIG. 5C a perspective view a a guide frame for a belt fitted.
Figure 5B:
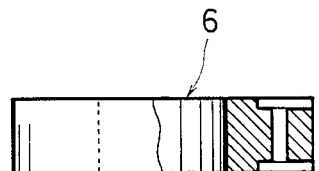
Figure 5C:
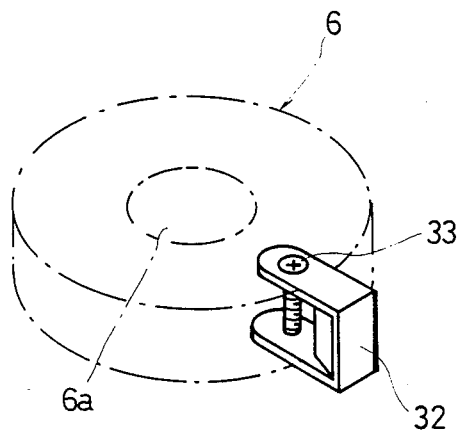

The circular pulley 6 has, as shown in FIGS. 5 A–C, a hole 6a for inserting the shaft rod 5 formed at its center, with a guide frame 32 for guiding the belt 9 fixed to its periphery by means of a screw 33, etc.

Figure 8:
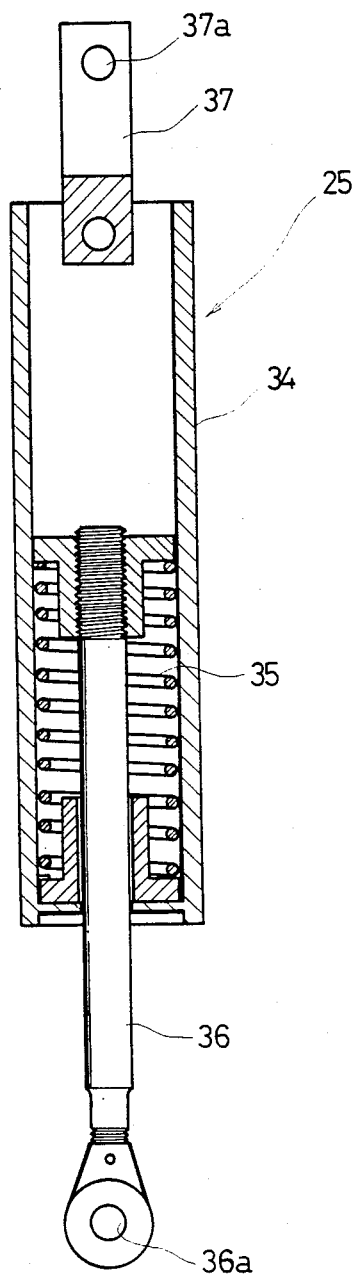
FIG. 8 is a longitudinal sectional view showing a modified example of the spring member.

The spring member 25 is not limited to that shown in the embodiment, but it may be a leaf spring or a member, as shown in FIG. 8, containing in an outer cylinder 34 a coil spring 35 and a rod 36 affixed to the coil spring 35, with a fitting plate 37 fixed thereto on the opposite side to the rod 36 and fitting holes 36a and 37a bored in the tip of the rod 36 and the fitting plate 37, or a gas spring fully filled with an inert gas or one which may be composed with a small capacity air cylinder capable of producing a thrust of the order corresponding to the acting force to be delivered in one direction only; thus, any arbitrary means are usable. Further, by controlling the aforementioned air cylinder, using a solenoid valve, etc., it is possible to turn the turnover arm 4 at higher speeds with less impact.

Numeral 38 desgnates solenoid valves and 39 denotes air conduits.

According to the present invention composed as hereabove described, as the dies 12 are separated fore aft, the actuator 1 rotates, causing the rotary shaft 2 and the rotary arm 4 fixed thereon to turn. For example, the tip of the turnover arm 4 placed outside the machine makes a turning motion to approach the dies 12 inside the machine. About the time when the turnover arm 4's tip has approached the dies 12, the molded wotk 13 emerges from one of the dies. As opened nails 8, 8 reach the work 13's tip which has emerged and the gripper 7 is retreated by the hydraulic cylinder 11's motion, then, the nails 8, 8 are closed, to take hold of the work 13, and the hydraulic cylinder 11 again brings the gripper 7 for word, thereby seizing and taking out the work 13; thereafter, the actuator 1 turns over, until the turnover arm 4's tip comes to be nearly horizontal outside the machine. When it is nearly horizontal, the nails are again opened, thereby releasing the work 13.

Figure 7:
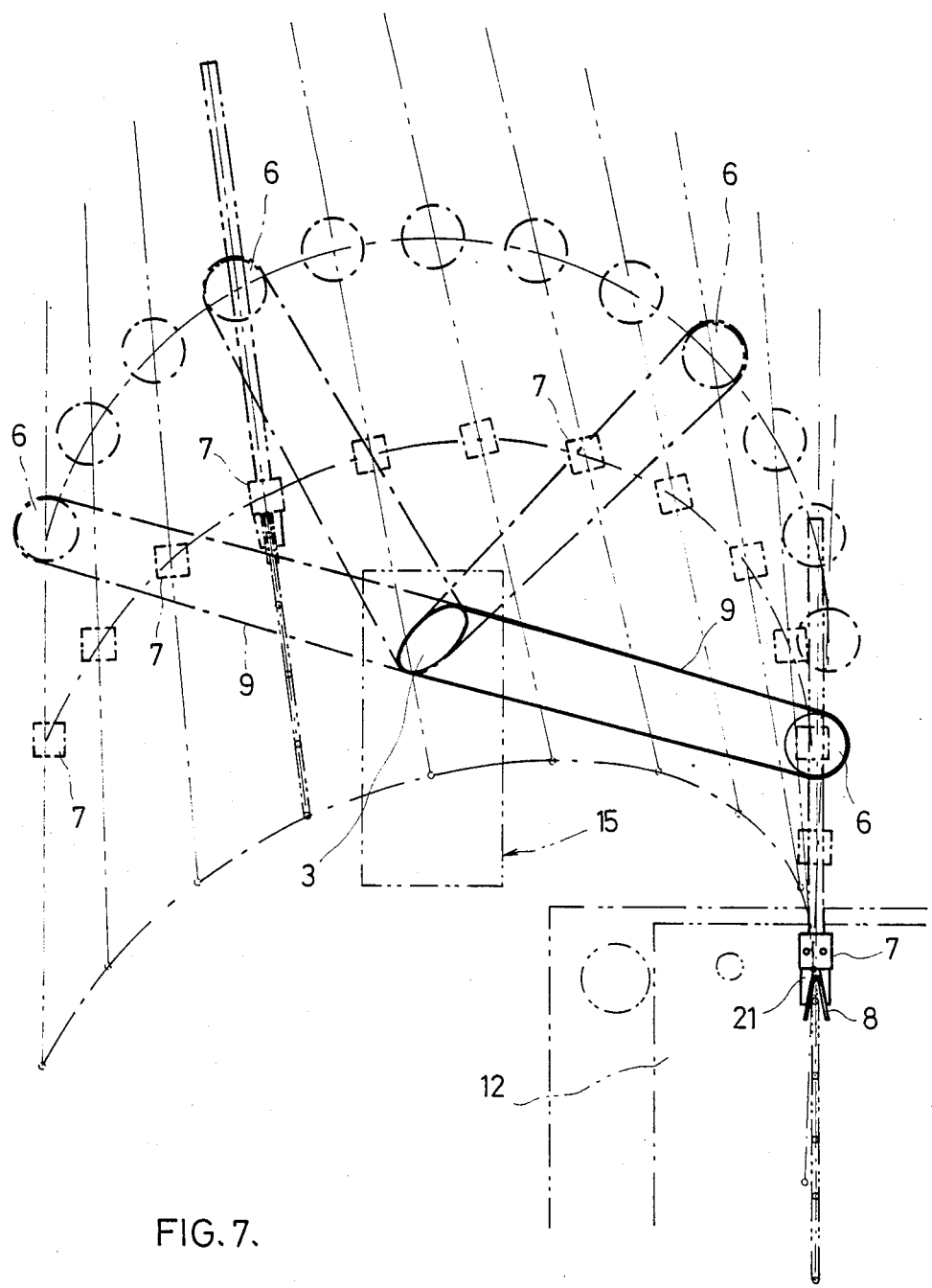
FIG. 7 is a step diagram showing the loci of the movements of the gripper and the work, etc.

As this turnover arm 4 makes a turnover from outside to inside the machine and again to outside the machine, as shown in FIG. 7, while the circular pulley 6 positioned at the tip of the turnover arm 4 goes on moving along an are, with the rotary shaft 2 as its center, the noncircular pulley does not rotate; accordingly, only the contacting parts of the belt 9 spanned between the noncircular pulley 3 and the circular pulley 6, to be turned therearound, go on moving, so that the belt contacting end distances between these pulleys, as separately measured for upper and lower positions, always vary; as a consequence, the circular pulley 6 rotates to compensate for the changed distances of upper and lower side and, then, the shaft rod 5 affixed thereto and the gripper 7 perform their own motions (direction forming) in correspondence with the turning of the turnover arm 4.

The shape of the noncircular pulley 3 and the belt 9's movement provide such adjustments that in accompaniment with the turnover movement of the turnover art 4, the circular pulley 6 makes its own rotation, so that the gripper 7 fixed to the shaft rod 5 of the circular pulley 6 moves about, always forming angles for easy holding of the work 13, angles for permitting the gripper 7 to come off the die 12, without touching on any parts of the equipment, or angles for easy release of the work 13.

Accordingly, the gripper 7 forms a locus of rising in a straight line from the state of projecting above the turnover arm 4's end, when its has seized the work 13, and then, tjat of drawing a flat parabola and the work 13's bottom also forms lower loci in the similar state, such that in correspondence with the dimensions of up—down and right—left movements, this work takeout device's total height may be reduced from the conventional one.

What is claimed is:

1. A mechanism for moving a gripper and adjusting the loci of its motions in a work takeout device comprising a noncircular pulley 3 mounted on the machine body and loosely fitted around a rotary shaft 2 of an actuator 1, a part near one end of a turnover arm 4 is fitted thereon on the outside of the noncircular pulley 3;

the noncircular pulley 3 is fixed on the machine body 15 in such a way as to be held in a definite direction without being affected by the rotary shaft 2's motion; the turnover arm 4 is fixed on the rotary shaft 2; in the other end of said rotary arm 4, a shaft rod 5 is rotatably inserted; on the shaft rod 5 projecting to both sides from the turnover arm 4, a circular pulley 6 is provided on the side corresponding to the noncircular pulley 3, and a gripper 7 having open - closable nails 8 at its tip on the other side; and a belt 9 is spanned between the aforementioned noncircular pulley 3 and circular pulley 6, to be turned therearound.

2. The mechanism for moving a gripper and adjusting the loci of its motions according to claim 1, wherein to one end of the turnover arm 4, one end of a spring member 25 which exhibits a maximum elastic rebounding force, when said turnover arm 4 is brought to be nearly horizontal, is securely coupled, while the other end of the spring member 25 is fixed to the machine body 15.

* * * * *

UNITED STATES PATENT AND TRADEMARK OFFICE
CERTIFICATE OF CORRECTION

PATENT NO. : 4,895,554

DATED : JANUARY 23, 1990

INVENTOR(S) : Tadokoro Isamu

It is certified that error appears in the above-identified patent and that said Letters Patent is hereby corrected as shown below:

Title page:

Column (73) Assignee: Change "Shinsei Kagaku Co., Ltd., Osaka, Japan" to --Shinsei Kagaku Co., Ltd., Shiga-ken, Japan--

Signed and Sealed this

Twenty-second Day of January, 1991

Attest:

HARRY F. MANBECK, JR.

Attesting Officer

Commissioner of Patents and Trademarks